United States Patent [19]

Hibbetts et al.

[11] Patent Number: 5,787,418

[45] Date of Patent: Jul. 28, 1998

[54] FIND ASSISTANT FOR CREATING DATABASE QUERIES

[75] Inventors: Michael Robert Hibbetts, Redwood City; Kester Li; Jonathan Michael Levine, both of San Francisco, all of Calif.

[73] Assignee: International Business Machine Corporation, Armonk, N.Y.

[21] Appl. No.: 708,117

[22] Filed: Sep. 3, 1996

[51] Int. Cl.$^6$ .................................................. G06F 17/30
[52] U.S. Cl. ................................................ 707/4; 707/1
[58] Field of Search .............................. 395/601, 602, 395/603, 604, 605, 606, 607, 608, 609, 610, 611, 612, 613, 614, 326, 701; 707/1, 2, 3, 4, 5, 6, 7, 8, 9, 10, 100, 101, 102, 103; 345/326

[56] References Cited

U.S. PATENT DOCUMENTS 5,157,783 10/1992 Anderson et al. ...................... 395/604
5,386,556 1/1995 Hedin et al. ............................ 395/604
5,446,842 8/1995 Schaeffer et al. ...................... 395/614
5,519,862 5/1996 Schaeffer et al. ...................... 395/701
5,583,982 12/1996 Matheny et al. ....................... 395/326
5,623,591 4/1997 Cseri ...................................... 395/326

*Primary Examiner*—Thomas G. Black
*Assistant Examiner*—Ruay Lian Ho
*Attorney, Agent, or Firm*—Merchant, Gould, Smith, Edell, Welter & Schmidt

[57] ABSTRACT

A method, apparatus, and article of manufacture which provides for finding database management information on a computer in a simple, user-friendly way to minimize errors and maximize database usership. The invention displays a window containing a card metaphor in a graphical user interface on a computer display. The window allows the user to enter a find type and a find condition selected from a displayed menu. The window also displays a natural language description of the current status of the find request, allowing the user to see, in real time, the scope of the request and the databases affected.

21 Claims, 10 Drawing Sheets

FIND ASSISTANT FOR CREATING DATABASE QUERIES

CROSS REFERENCE TO RELATED APPLICATION

This application is related to the following co-pending and commonly-assigned patent applications:

Application Ser. No. 08/707,140, "USER INTERFACE FOR VISUALLY DEPICTING INNER/OUTER/LEFT/RIGHT JOINS IN A DATABASE SYSTEM," filed on same date herewith, by Darryl J. Mocek et al., and Application Ser. No. 08/707,139, entitled "NATURAL LANGUAGE TRANSLATION OF AN SQL QUERY," filed on same date herewith, by Darryl J. Mocek et al., Both of which applications are incorporated by reference herein.

BACKGROUND OF THE INVENTION

1. Field of the Invention

This invention relates generally to methods of accessing information stored in a database management system (DBMS), and in particular to a computer-implemented user interface for creating DBMS queries.

2. Description of Related Art

Large-scale integrated database management systems provide an efficient, consistent, and secure means for storing and retrieving vast amounts of data. This ability to manage massive amounts of information is a virtual necessity in business today.

Relational Database Management Systems (RDBMS) software using Structured Query Language (SQL) interfaces are well known in the art. The SQL interface has evolved into a standard language for RDBMS software and has been adopted as such by both the American National Standards Institute (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Unfortunately, while powerful, the SQL interface can be difficult to use, especially for laypersons with little or no experience with databases or computers. This problem limits the application of RDBMS technology to provide business information, often to those who need it the most. Potential RDBMS users often fail to avail themselves to the benefits of RDBMS technology because they are either intimidated by or reluctant to learn new technology. Even if they are willing to learn, expensive and lengthy training may be required before these potential users achieve a basic functional capability. SQL's idiosyncrasies also have other negative consequences. For example, both novice and experienced SQL users often formulate improper SQL commands, and obtain search results which fail to disclose critical data or require the DBMS to search through more data than is required, lengthening the search, and placing unnecessary demands on DBMS processing.

SUMMARY OF THE INVENTION

To overcome the limitations in the prior art described above, and to overcome other limitations that will become apparent upon reading and understanding the present specification, the present invention discloses a method, apparatus, and article of manufacture for displaying database management information on a computer. The method comprises the steps of displaying a window containing a card metaphor on a computer display device, accepting a find type and a find condition from a user input device coupled to the computer, interpreting the user-selected find request to produce a natural language description of the request, and presenting the natural language description of the command to the user on the display device. In an exemplary embodiment presented herein, the information displayed to the user includes a database table box having a list of database tables, an associated database field box having a list of database fields associated with the database tables, a relational condition box, and a search string edit box, in which the user may enter a combination of search strings and logical relationships between the search strings.

The present invention therefore presents the user with a list of selectable database tables, and fields associated with those tables, a box to enter search strings, and a list of selectable relational conditions to apply to the database fields and search strings. The present invention interprets the user-selected values for these items, and presents, on the same screen, a natural language description of the find request. As a result, the user can read a plain language description of the current database command while the information is entered, and before the search command is transmitted to the relational database management system. This averts potential database command errors and the resulting processing delays, while at the same time, encouraging novice users to use the RDBMS, and to experiment with different SQL queries.

The present invention also provides SQL functionality by allowing the user to construct search strings with logical relationships between search parameters and to create complex SQL commands by linking simpler SQL commands with logical conditional operators.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
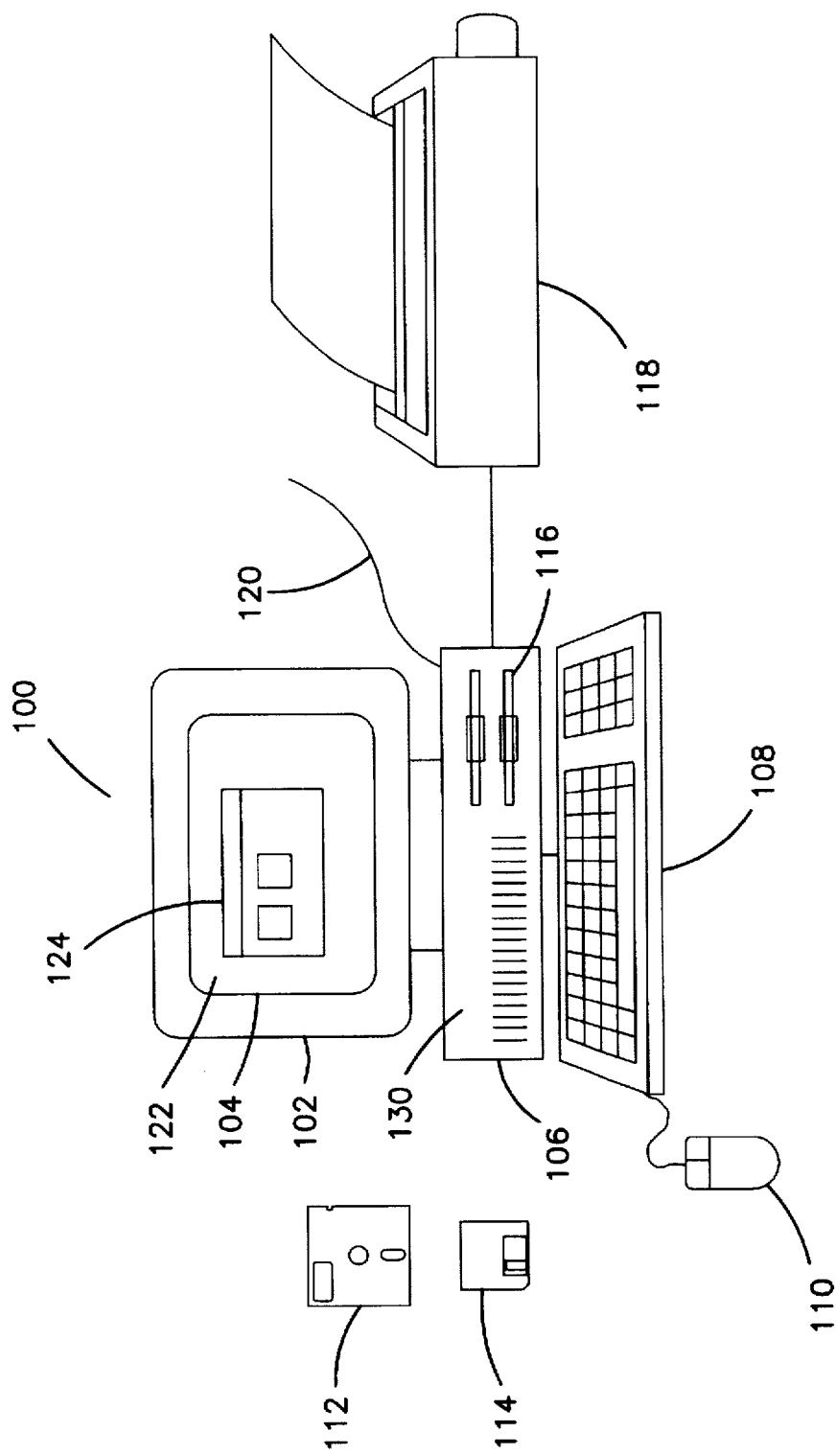
FIG. 1 illustrates an exemplary computer hardware environment that could be used with the present invention.

FIG. 1 illustrates an exemplary computer hardware environment that could be used with the present invention. In the exemplary environment, a computer system 100 comprises a computer 106 coupled to I/O devices comprising a monitor 102, a keyboard 108, a mouse device 110, and a printer 118. The computer 106 could also be coupled to other I/O devices, including a local area network (LAN) or wide area network (WAN) via interface cable 120. The monitor 102 presents a display 104 visually depicting information from the computer system 100 to the user.

The computer 106 comprises a processor and a memory including random access memory (RAM), read only memory (ROM), and/or other components. The computer 106 operates under control of an operating system 122 stored in the memory to present data to the user on the display 104 and to accept and process commands from the user via keyboard 108 and mouse device 110.

The present invention is preferably implemented using one or more computer programs or applications through a graphical user interface. These computer programs are depicted as windows 124 presented on the display 104, operating under control of the operating system 122.

Generally, the operating system and the computer programs implementing the present invention are tangibly embodied in a computer-readable medium, e.g. one or more of removable data storage devices 112, 114, such as a zip or floppy disc drive, or fixed data storage devices 130, including for example, a hard drive, CD-ROM drive, or tape drive. Also, the relational databases used with the present invention can be stored in data storage devices 130, 112, 114, or may be stored off-line and accessed via interface cable 120.

Those skilled in the art will recognize that the exemplary environment illustrated in FIG. 1 is not intended to limit the present invention. Indeed, those skilled in the art will recognize that other alternative hardware environments may be used without departing from the scope of the present invention.

User Operation

The operation of the present invention is described with reference to FIG. 2 through FIG. 7, which illustrate exemplary embodiments of the user interface aspects of the present invention.

Type of Find Card Panel

Figure 2:
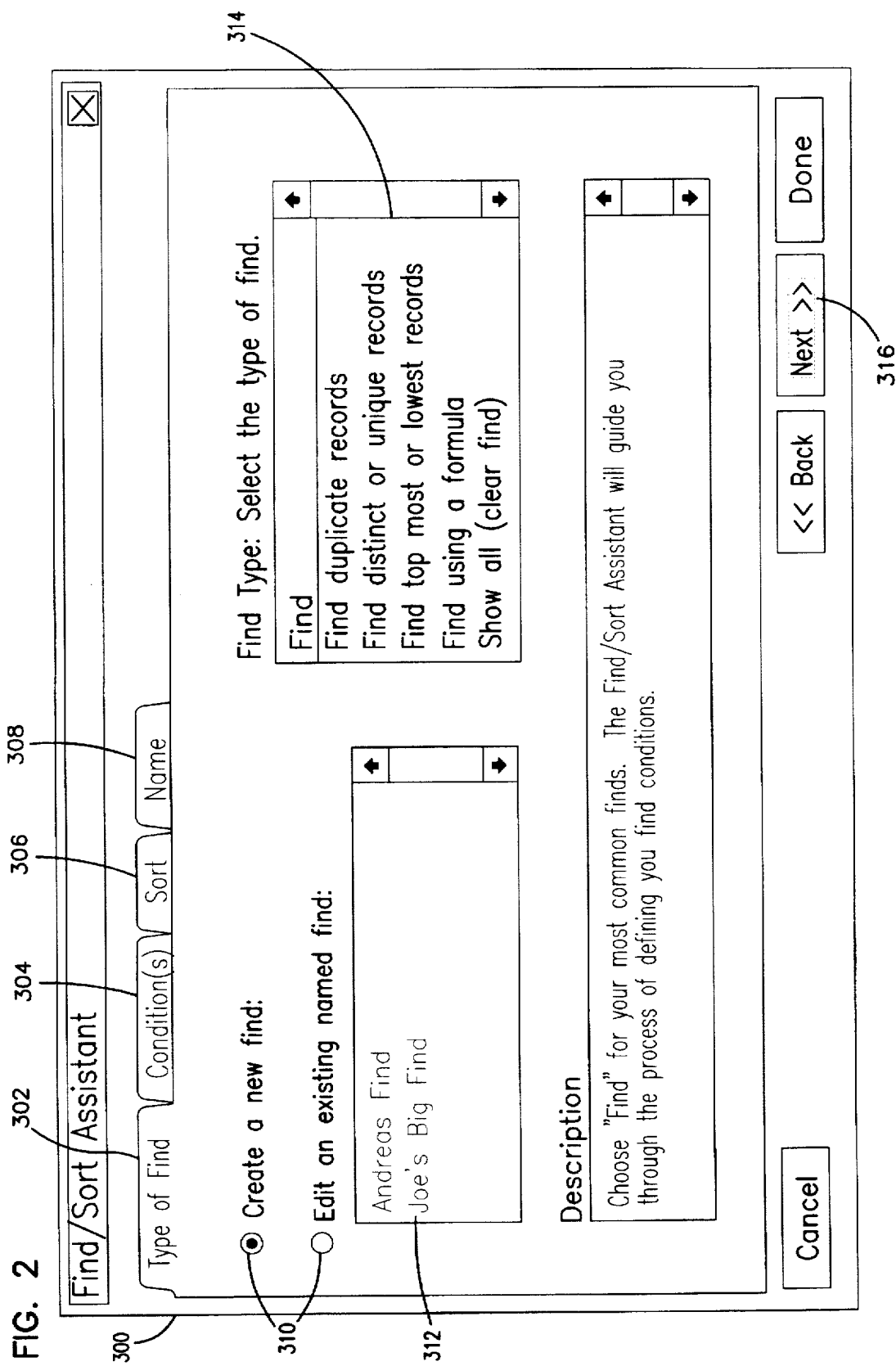
FIG. 2 is a diagram illustrating a type of find window compatible with the present invention.
Figure 3:
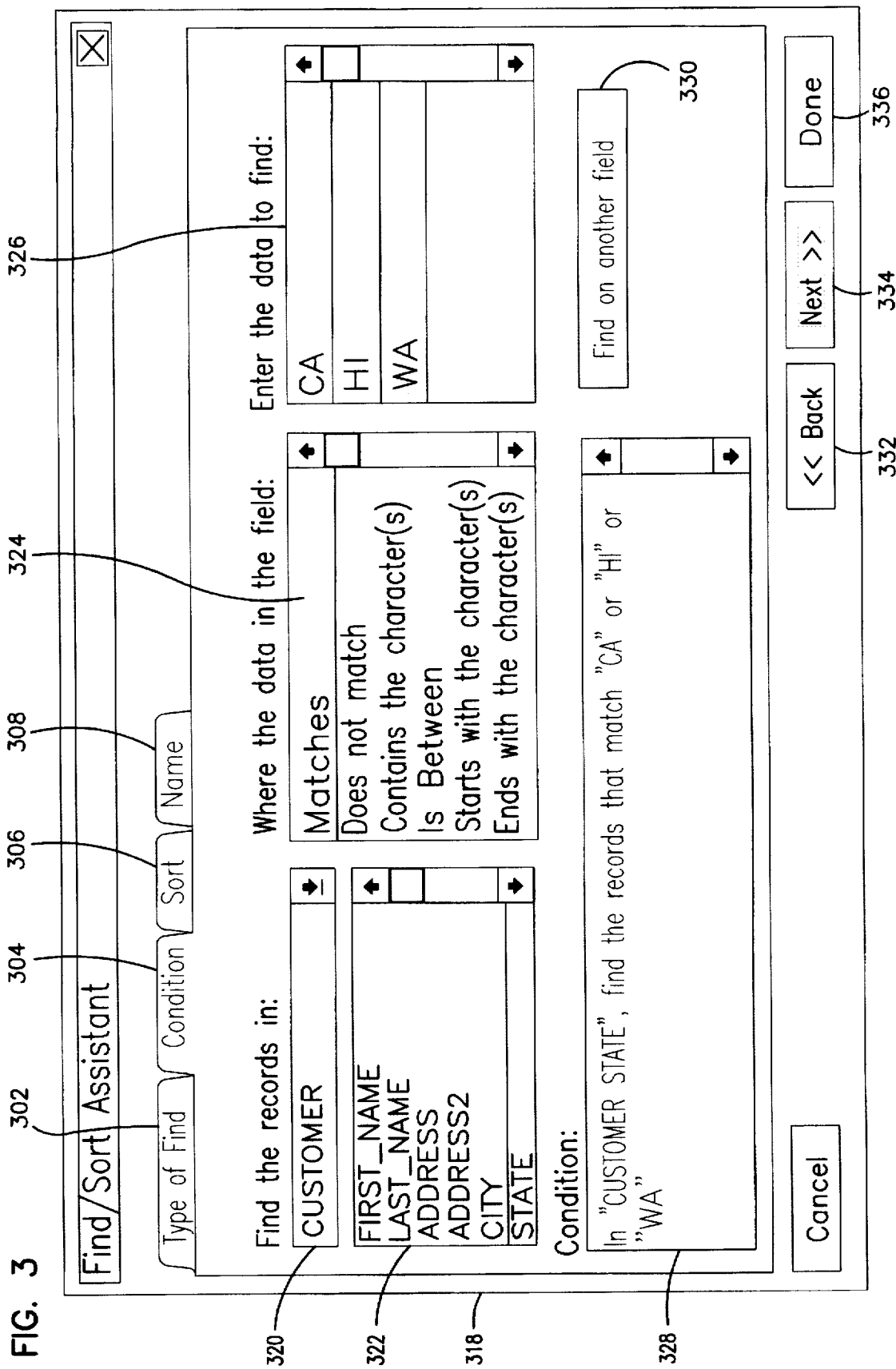
FIG. 3 is a diagram illustrating a conditions window compatible with the present invention.

FIG. 2 presents a diagram of an exemplary embodiment of the user-interface of the present invention. The user interface comprises a type of find window 300 presented on the display 104 of the computer system 100, which includes a plurality of tabs 302–308 used to navigate the user interface. The information shown in FIG. 2 is displayed when the user selects the type of find tab 302. This provides a list of the existing find requests the user has previously stored in the named find box 312. First, the user must indicate whether a new find request is being created or the user wishes to edit an existing find request by selecting from radio buttons 310. If the user selects create a new find, the condition window 318 appears, as shown in FIG. 3. The user can select different find request types by selecting from the find type list 314. The user can select on the next button 316 or the condition tab 304, to proceed.

Condition Window

FIG. 3 shows the condition window of the present invention. The condition window 318 includes a database tables display box 320, a database fields box 322, field, field type, and field width of the currently chosen database field. The condition window 318 allows a user to select from a display box of database tables 320. Upon selecting a database table, a fields list 322 is displayed which allows the user to select any of the fields defined for the currently selected table. A find method 324 is selected by choosing an entry from the list of find methods 324. The list of find methods 324 consists of a variety of methods, such as matches, does not match, contains the character(s), is between, starts with the character(s), ends with the character(s), is exactly equal to, is greater than (>), is greater than or equal to (>=), is less than (<), is less than or equal to (<=), and so on. It will be recognized that other find conditions may be used with the present invention without loss of generality.

The next selection the user makes is the find criteria of the search, displayed in the data to find box 326. The data to find box preferably is initialized as a one column grid object with one row enabled. A user can enter many values as the criteria in the find box 326 either horizontally, separated by commas, or vertically. For example, as shown in FIG. 3, if the user wanted to find all records in the Customer table where the State field was CA, HI and WA, the selection would be "State" from the fields list 322, "Matches" from the find methods list 324, and "CA", "HI", and "WA" entered in the data to find box 326. When the "C" in CA was entered by the user in the first row of the data to find box 326, the second row in the grid object became enabled to allow the entry of more than one state. This is very useful in helping the user realize that more than one value can be entered as a criterion at this point.

A natural language description corresponding to the find request is displayed in display box 328 as the user makes selections. It will be noted that these multiple entered values are related to the find request through logical OR operators, as shown in the display box 328. A virtual "Done" button 336 is enabled during the selection process which terminates the current session of the find assistant. The user can select on the next button 334 or the sort tab 306, to proceed. If the user wanted to find using values in another field, the "Find on another field" button 330 moves to a new panel showing a second condition window 338, as shown in FIG. 4.

Second Condition Window

Figure 4:
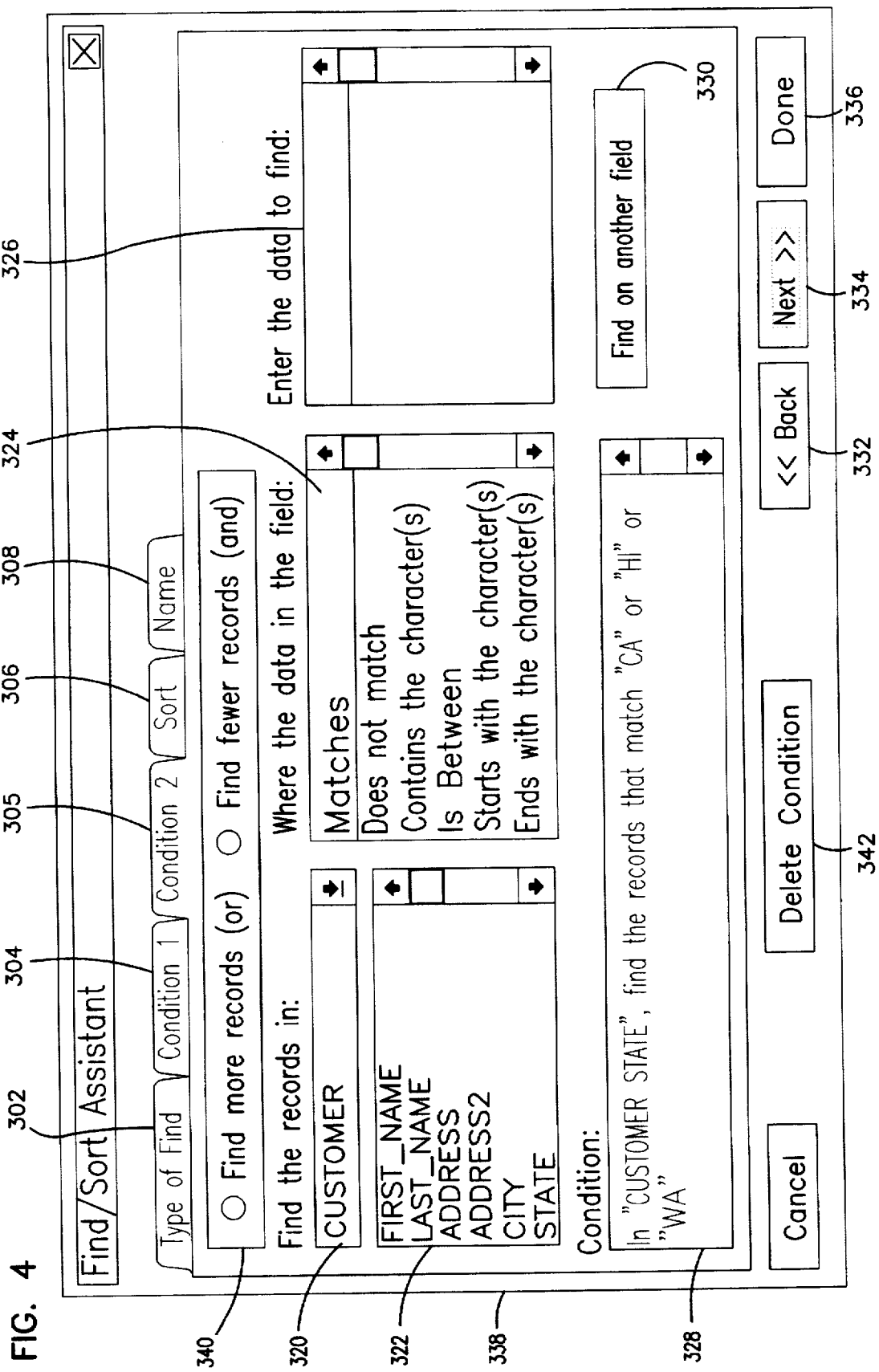
FIG. 4 is a diagram illustrating a second conditions window compatible with the present invention.

FIG. 4 shows a second condition window of the present invention. The second condition window 338 is similar to the condition window 318 shown in FIG. 3. The second condition window 338 allows a user to select a database table, a field from the table, a find method, and find criteria. The user indicates by selecting from radio buttons 340 whether the new find condition is related to the existing condition via a logical AND or logical OR condition. A previously added condition may be deleted by selecting the delete condition button 342.

The user can select on the next button 334 or the sort tab 306, to proceed, or the back button 332 to return to the previous window. The "Done" button 336 is enabled during the selection process which terminates the current session of the find assistant.

Sort Window

Figure 5:
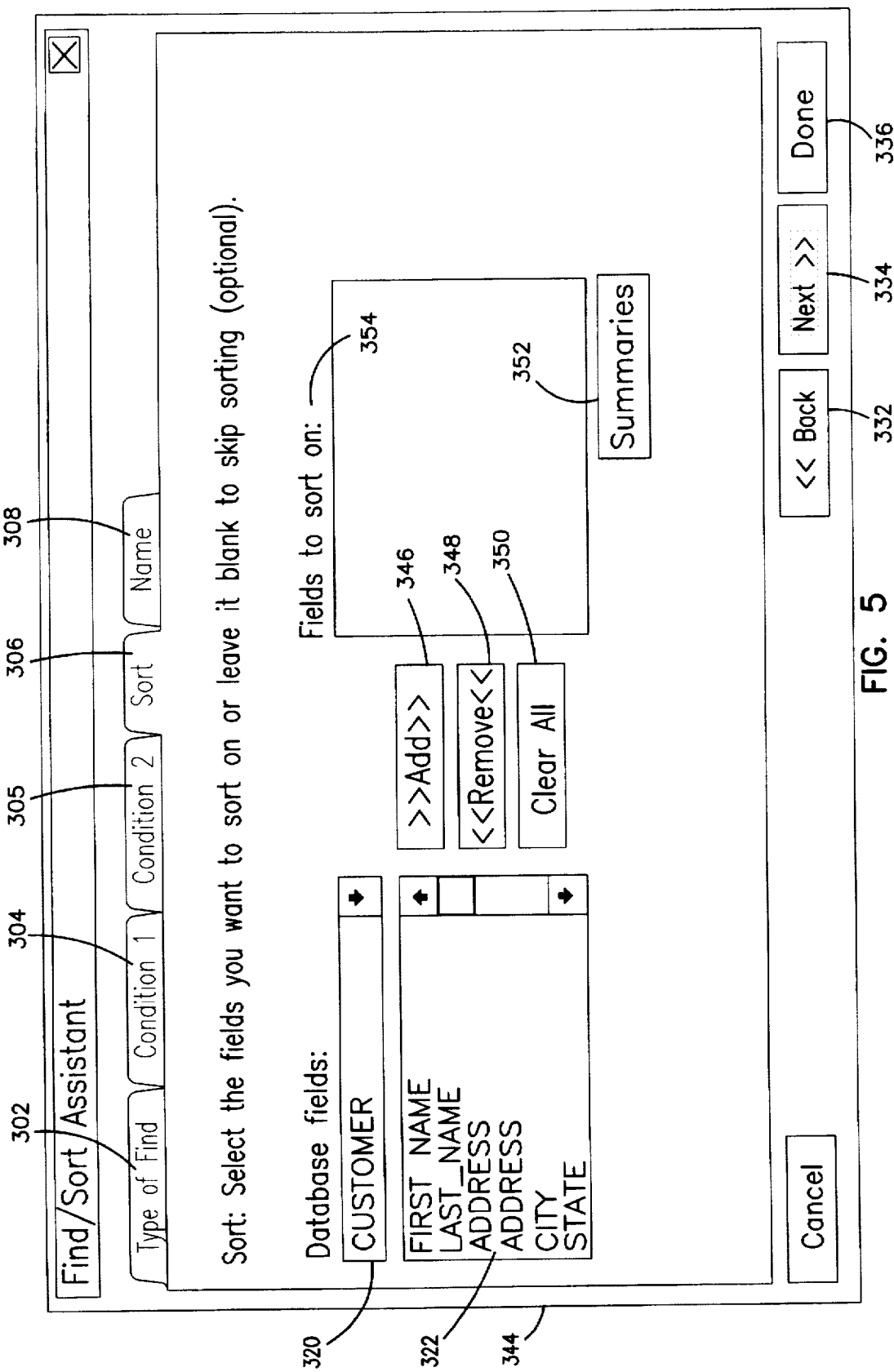
FIG. 5 is a diagram illustrating a sort window compatible with the present invention.

FIG. 5 presents an illustration of sort window 344 of the present invention, which is selected by the sort tab 306. The sort window 344 allows the user to sort data before viewing it on the display 104. The sort window 344 contains a sort window database field listbox 322, which lists all of the database fields in the user-selected database tables. Using the mouse device 110, the user can double click on any of these fields or single click on the field and select the sort window add button 346 to move them to the "fields to sort" 354. Likewise, the user can remove fields from the "fields to sort" listbox 354 by double clicking on the selections, or by single clicking on the selections and selecting the sort window remove button 348. All fields in the "fields to sort" listbox 354 can be cleared by selecting the sort window clear all button 350.

SQL Window

Figure 6:
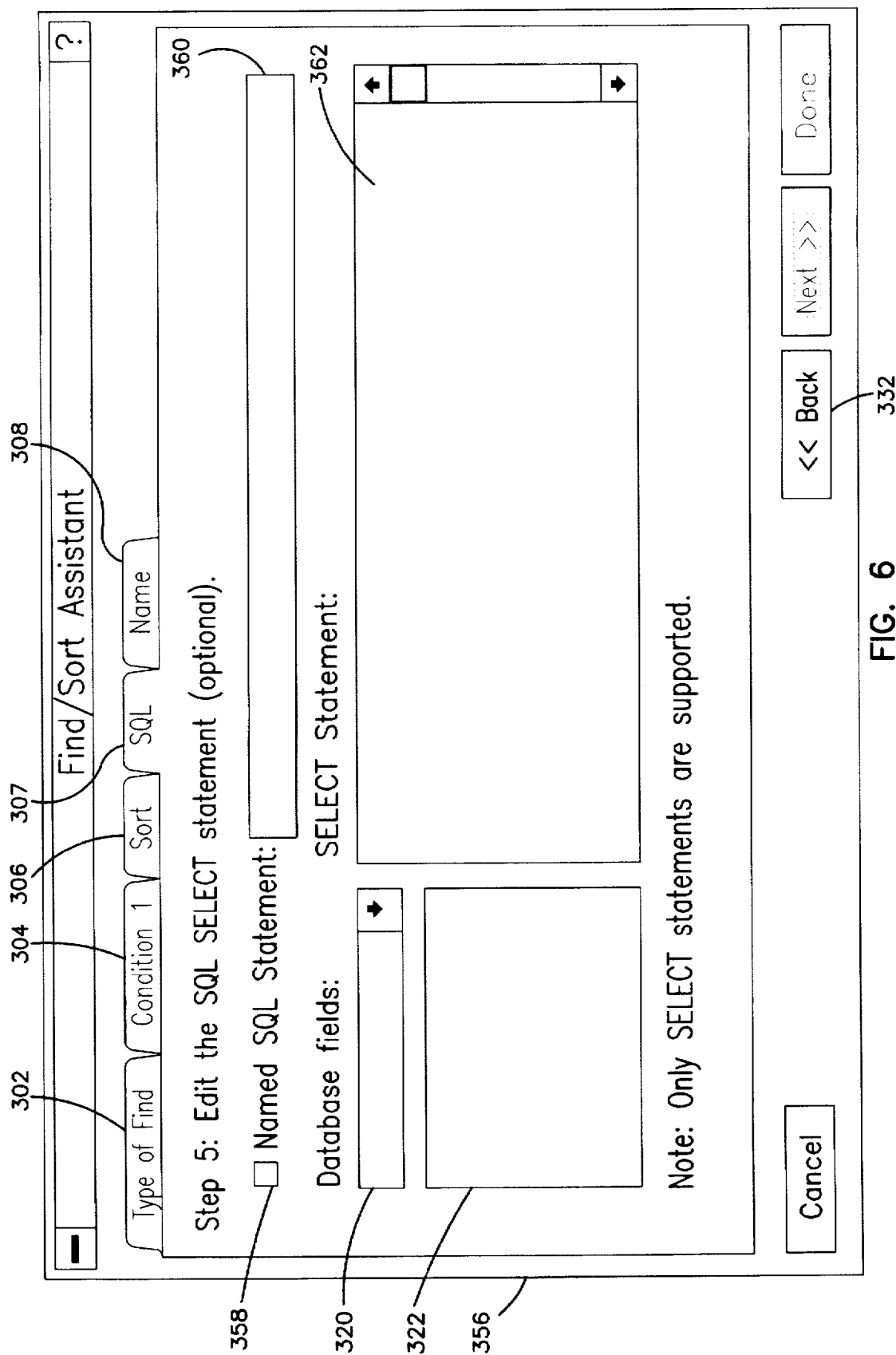
FIG. 6 is a diagram illustrating a SQL window compatible with the present invention.

FIG. 6 presents an exemplary embodiment of the SQL window. The SQL window 356 is presented on the display 104 when the user selects the SQL tab 307.

The SQL window 356 comprises an SQL statement edit box 362, in which an SQL statement generated by the foregoing user input is displayed. The SQL statement word wraps within the box automatically. If the SQL statement is too long to view in the SQL statement edit box 362 in its entirety, the statement is word-wrapped and scroll bars are appended to the SQL statement edit box 362.

Each keyword in the SQL statement (such as SELECT, FROM, WHERE, ORDER BY) are placed on a new line to increase readability. Using the mouse device 110, the user can select within this field and highlight information. If the user attempts to modify information in the SQL statement edit box 362, a dialog box appears and warns the user that all tabs except the SQL tabs 307 will become disabled, and other aspects of the user interface described herein will no longer be available for use. The dialog box allows the user to proceed or return. If the user returns, the SQL window 356 is again presented on the display 104, with no changes made. If the user proceeds, the SQL statement edit box 362 will become active, and will allow manual SQL statement changes.

The SQL window 356 also comprises an SQL window database table dropdown listbox 320 and an SQL window associated field listbox 322, which allow the user to view the tables and fields and is provided primarily for user reference when making editing changes to the SQL statement edit box 362. If the user selects the SQL window database table dropdown listbox tab 320, a list of all database tables that are currently open and available for searching are displayed in the SQL window database table dropdown listbox 320. When a database table is selected, the names of the fields associated with the selected database table are displayed in the SQL window associated fields listbox 322. When the user selects a field, the database field name will be placed in the SQL statement edit box 362 at the cursor position. Alternatively, the user then may also drag a field name from the SQL window associated fields listbox 322 and drop it into the SQL statement edit box 362. When the user is dropping a field name, an extended underscore (_____) will appear in the SQL statement editbox 362 allowing the user to select where in the SQL statement edit box 362 the fieldname will be placed. If this is the first item to be changed, the database field name is appended to the SQL statement, and a dialog box appears to warn the user after the modifications have been made, the user must make any further modifications manually.

A feature of the present invention is described with reference to the named SQL statement indicator 358 and edit box 360. This allows the user to give a simple, plainlanguage name for frequently used searches, thereby making the user interface easier to use. For example, the user may wish to name an SQL statement retrieving all customers in California whose orders exceeded $10,000 by naming the SQL statement "GOOD_CAL." Thereafter, using this feature, the user can use the term "GOOD_CAL" in place of the equivalent SQL statement.

The user may also proceed directly to the SQL window 356 without entering information in the tab windows selected by tabs 302–308. When this happens, the user can click the SQL statement box 362 and manually enter an SQL SELECT statement. Since no SQL statement was created, no warning dialog box is required in this situation, however, as soon as the user begins entering data into the SQL statement box 362 manually, all tabs except the SQL tab 307 are disabled. If the user deletes the entire manually entered SQL SELECT statement, all tabs 302–308 become re-enabled.

After the SQL statement is completely entered, the user selects name tab 308. At this time, the SQL statement is parsed and sent to the SQL database. If the parser finds an error within the SQL statement, a dialog box indicates as such to the user.

Name Window

Figure 7:
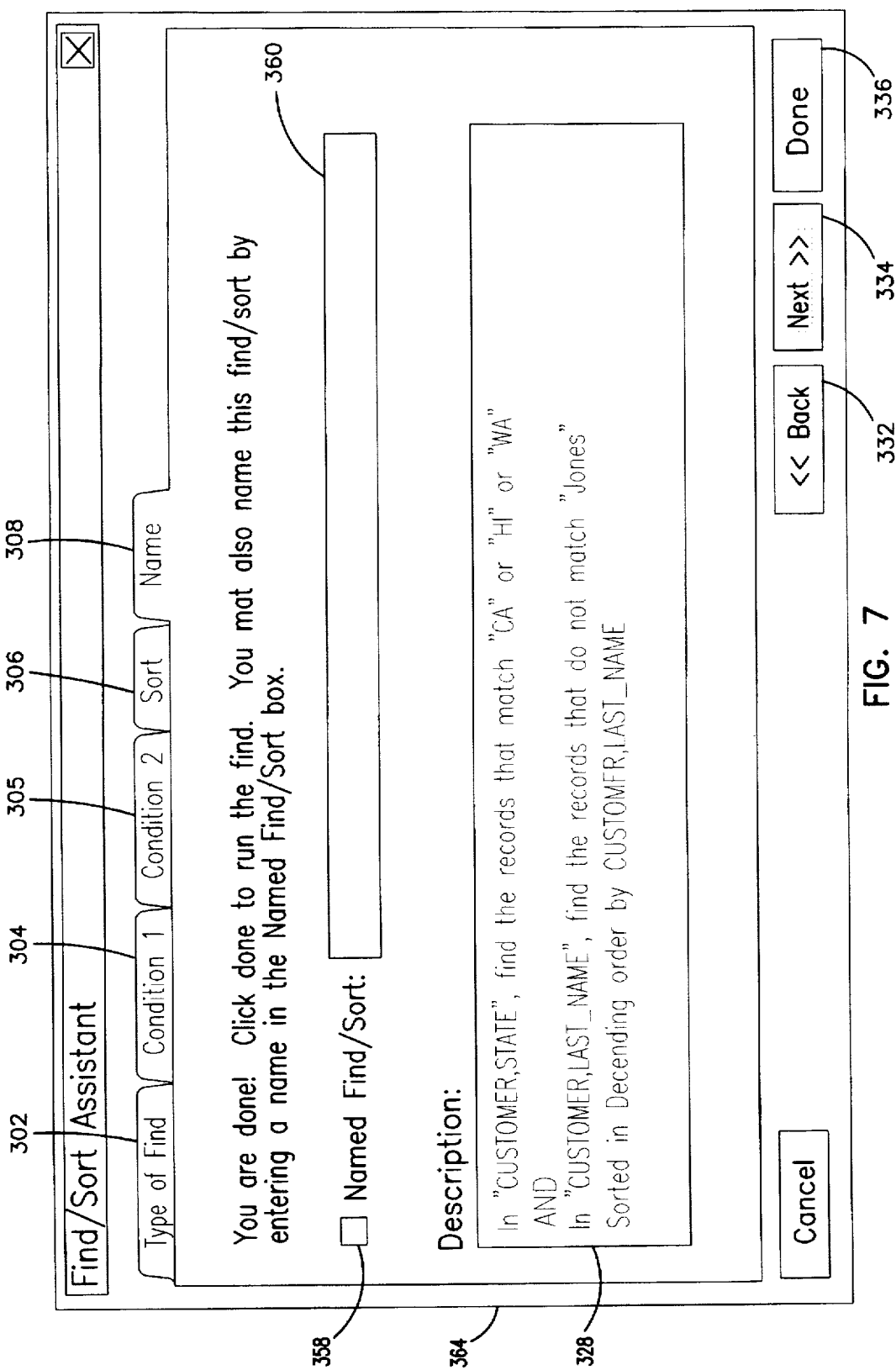
FIG. 7 is a diagram illustrating a name window compatible with the present invention.

FIG. 7 presents an exemplary embodiment of the name window. The name window 364 is presented on the display 104 when the user selects the name tab 308. A natural language description corresponding to the find request is displayed in display box 328. The find request can be named by using the mouse 110 to click on the named statement indicator 358 and entering the name through edit box 360.

The user can select on the back button 332 to return to the previous window. The "Done" button 336 is enabled during the selection process which terminates the current session of the find assistant and execute the resulting query.

Flow Control

Figure 8A:
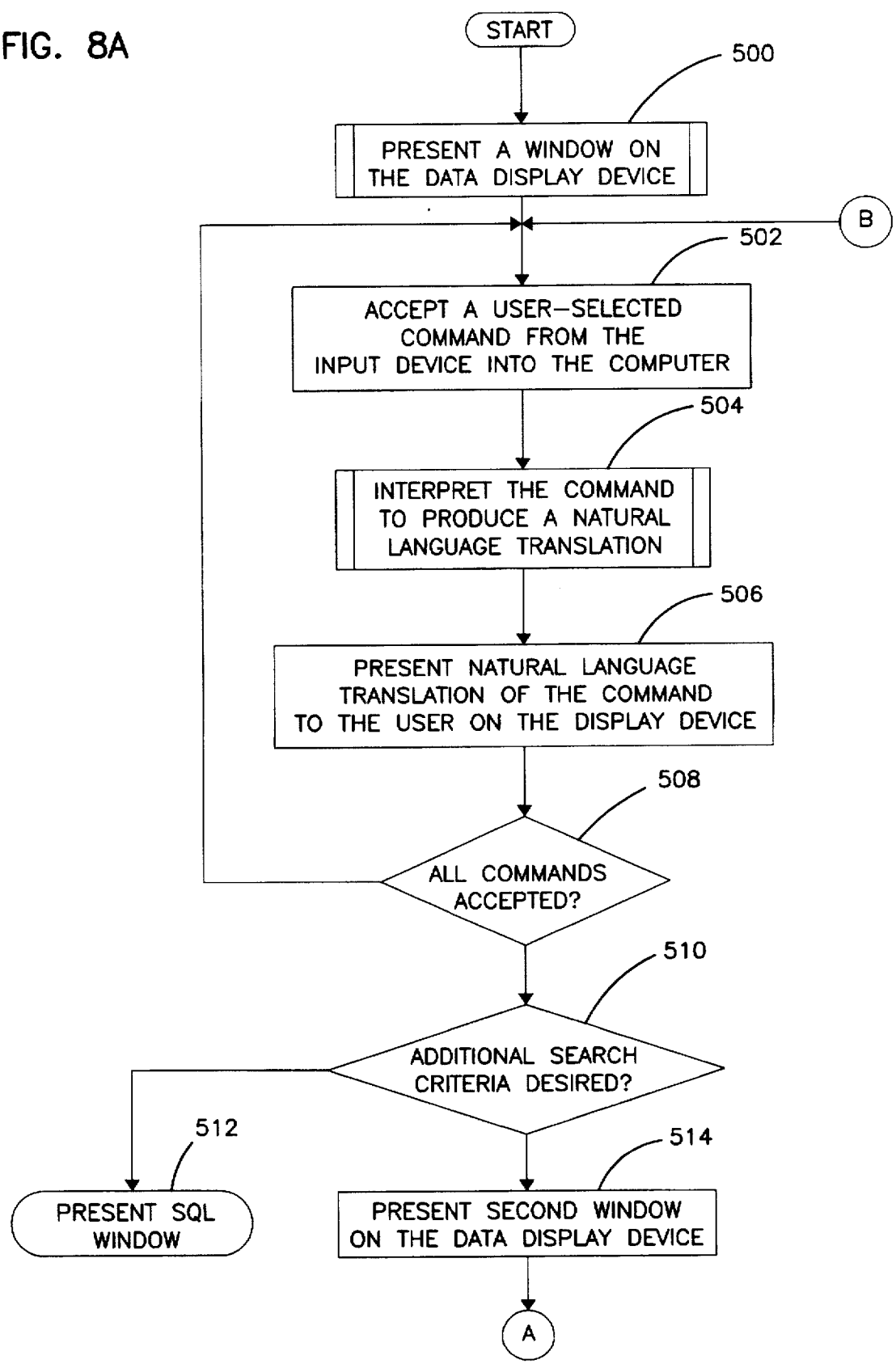
FIGS. 8A–8C are flow diagrams describing the operation of the present invention.

FIG. 8A is a flow diagram illustrating the logical operation of the present invention. The process begins with the computer 106 presenting a window 124 on the display 104. This is represented by block 500 in FIG. 8A. In one embodiment, the window 124 is the condition tab window 318 depicted in FIG. 3. Next, the computer 106 accepts user-selected commands from the user input device such as the keyboard 108 and mouse device 110. This process is depicted by block 502. The user-selected commands are selected from a group comprising a database table dropdown listbox 320 having a list of database tables, the associated database field listbox 322, a relational condition listbox 324, and a search string edit box 326. After the user makes the selection, the command is interpreted as depicted in blocks 504 and 506, and a natural language translation of the command is presented to the user on the display 104. This allows the user to select commands from a menu structure and immediately see the result in plain language on the same display. The foregoing process is completed until, as shown in block 508, all commands have been accepted, and an SQL query has been defined.

If no additional search criteria are desired, block 510 presents the SQL window 356 to the user to allow manual editing of the SQL command. If additional search criteria are required, a second condition window 338 is presented to the user on the display 104. This is depicted in block 514.

Figure 8B:
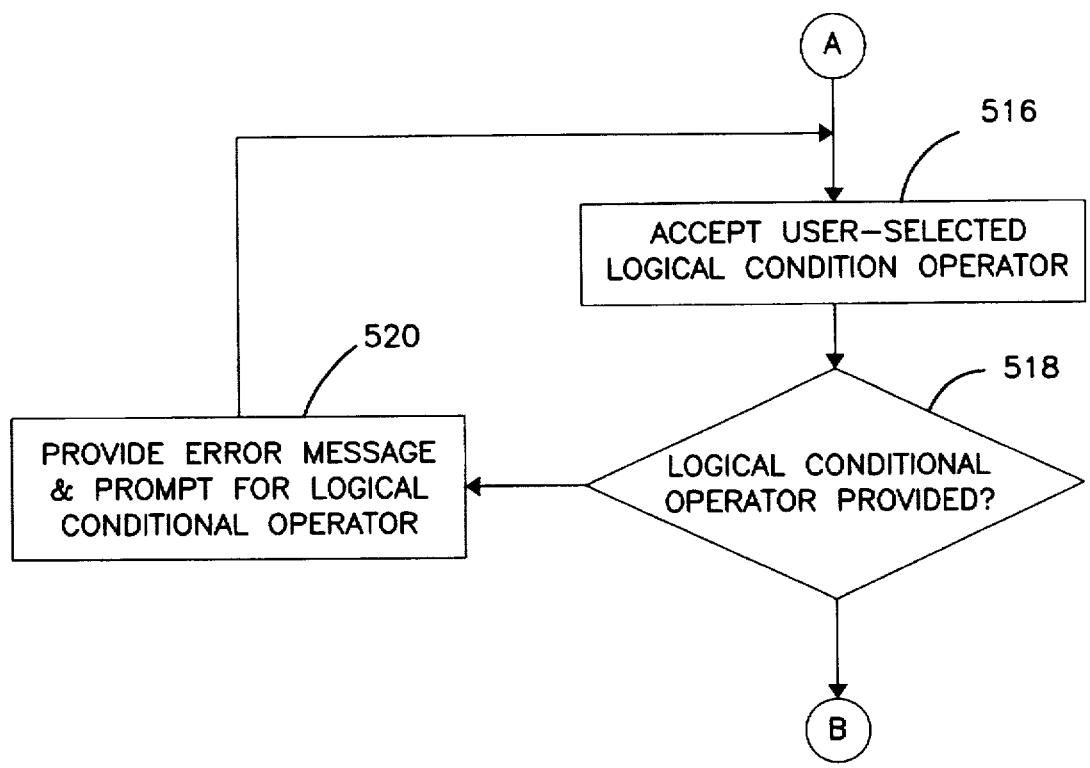

FIG. 8B illustrates the remainder of the process described above. After presenting a second condition window 338 on the display device 104, the computer 106 accepts a user-selected logical condition to define the logical relationship between the previous search criteria and the additional criteria about to be defined by the user. This requires that the user input a logical conditional operator such as an "or" which retrieves more data records, or an "and" which retrieves less data records. This process is depicted in block 516. If a logical conditional operator is not supplied, block 518 prompts interrupts processing, and prompts the user to enter a logical conditional operator. This process is visually depicted in FIG. 4, where the user selects the logical conditional operator using radio buttons 340.

After the logical conditional operator is supplied, processing returns to block 502, and the computer 106 accepts additional user-selected command information. This information will include, for example, a second database table, a second associated database field, a second relational conditional operator, and a second user-defined search string. As before, this information is interpreted by block 504, and a natural language translation of the search request is presented to the user on the display device as the information is entered.

Figure 8C:
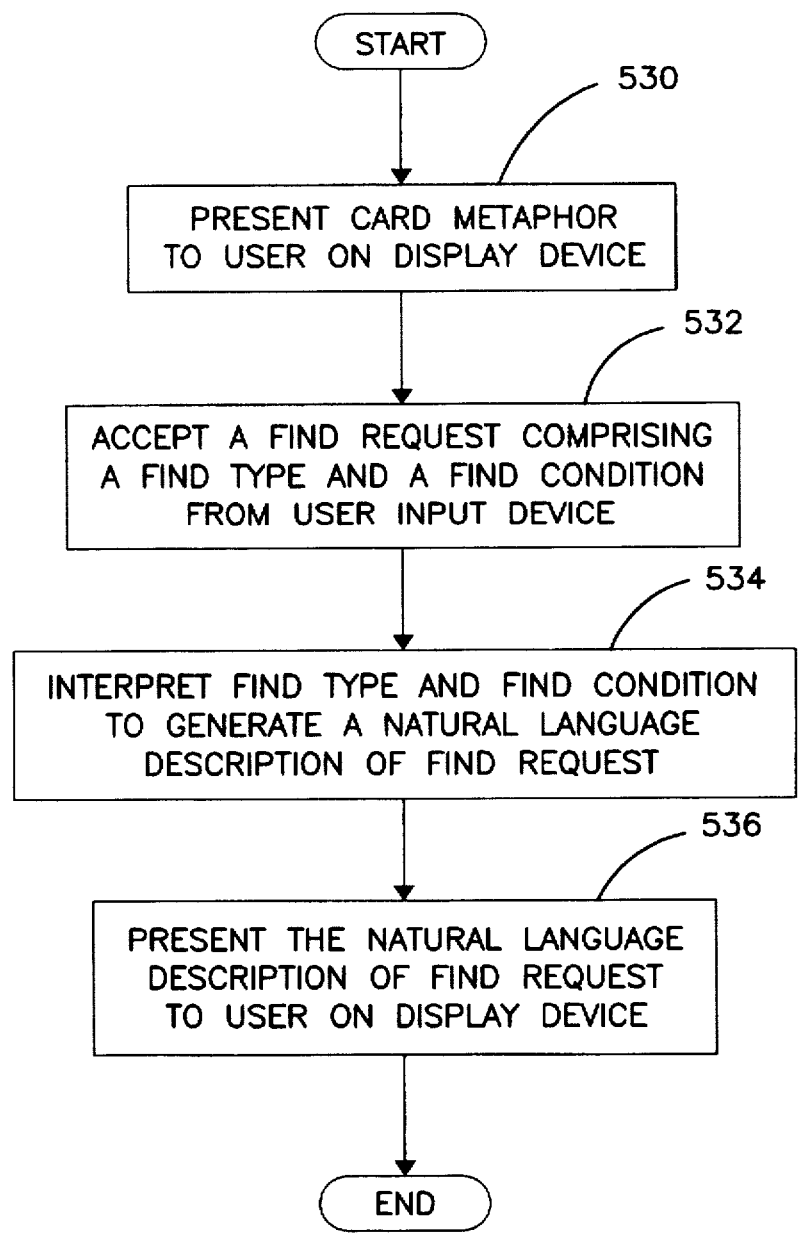

FIG. 8C illustrates the basic steps of the process described above. At block 530, the system displays a window containing a card metaphor on the display 104. At block 532, the system accepts, through the card metaphor, a find request comprising a find type and a find condition entered from the data input device from the user. At block 534, the find type and find condition are interpreted to generate a natural language description of the find request, and at block 536 a natural language description of the find request is presented in the display 104.

Conclusion

This concludes the description of the preferred embodiment of the invention. The present invention discloses a method, apparatus, and article of manufacture for displaying database management information on a computer. The method comprises the steps of displaying a window containing a card metaphor on a computer display device, accepting a find type and a find condition from a user input device coupled to the computer, interpreting the user-selected find request to produce a natural language description of the request, and presenting the natural language description of the command to the user on the display device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method of finding information in a memory of a computer having a processor, data storage device, display device, and data input device, the computer processor running a database management system having a plurality of database tables each including a plurality of associated database fields having database data, the method comprising the steps of:

(a) displaying a window containing a card metaphor on the display device;

(b) accepting, through the card metaphor, a find request comprising a find type and a find condition entered from the data input device;

(c) interpreting the find type and find condition to generate a natural language description of the find request; and (d) presenting the natural language description of the find request in the window on the display device.

2. The method of claim 1, wherein the card metaphor comprises a first card panel having a first radio button for creating a new find, a second radio button for editing an existing named find, and a list of find types.

3. The method of claim 2, wherein the card metaphor comprises a second card panel having a list of the database tables, an associated database field box having a list of the associated database fields, a list of relational conditions, and a find criteria edit box.

4. The method of claim 3, wherein the second card panel further comprises a condition box for displaying the natural language description of the find request.

5. The method of claim 3, wherein the second card panel further comprises a first radio button for specifying an OR logical operator and a second radio button for specifying an AND logical operator.

6. The method of claim 3, wherein the card metaphor comprises a third card panel having a list of the database tables, an associated database field box having a list of the associated database fields, and a sort fields box showing a list of the associated database fields used as sort fields.

7. The method of claim 3, wherein the card metaphor comprises a fourth card panel having a SQL entry field for accepting an SQL database query instruction.

8. An apparatus for finding information with a database management system having a plurality of database tables each including a plurality of associated database fields having database data, the apparatus comprising:

(a) a computer, comprising a processor and a memory storing the database tables;

(b) means, performed by the computer, for displaying a window containing a card metaphor on a display coupled to the computer;

(c) means, performed by the computer for accepting, through the card metaphor, a find request comprising a find type and a find condition from a user input device into the computer;

(d) means, performed by the computer, for interpreting the find type and find condition to generate a natural language description of the find request;

(e) means, performed by the computer, for presenting a natural language description of the find request to the user in the window on the display.

9. The apparatus of claim 8, wherein the card metaphor comprises a first card panel having a first radio button for creating a new find, a second radio button for editing an existing named find, and a list of find types.

10. The apparatus of claim 9, wherein the card metaphor comprises a second card panel having a list of the database tables, an associated database field box having a list of the associated database fields, a list of relational conditions, and a find criteria edit box.

11. The apparatus of claim 10, wherein the second card panel further comprises a condition box for displaying the natural language description of the find request.

12. The apparatus of claim 10, wherein the second card panel further comprises a first radio button for specifying an OR logical operator and a second radio button for specifying an AND logical operator.

13. The apparatus of claim 10, wherein the card metaphor comprises a third card panel having a list of the database tables, an associated database field box having a list of the associated database fields, and a sort fields box showing a list of the associated database fields used as sort fields.

14. The apparatus of claim 10, wherein the card metaphor comprises a fourth card panel having a SQL entry field for accepting an SQL database query instruction.

15. A program storage device, readable by a computer having a processor, data storage device, display device, data input device, and a memory storing a plurality of database tables each including a plurality of associated database fields having database data, tangibly embodying one or more programs of instructions executable by the computer to perform method steps of finding information in the memory of the computer, the method comprising the steps of:

(a) displaying a window containing a card metaphor on the display device;

(b) accepting, through the card metaphor, a find request comprising a find type and a find condition entered from the data input device;

(c) interpreting the find type and find condition to generate a natural language description of the find request; and (d) presenting the natural language description of the find request in the window on the display device.

16. The program storage device of claim 15, wherein the card metaphor comprises a first card panel having a first radio button for creating a new find, a second radio button for editing an existing named find, and a list of find types.

17. The program storage device of claim 16, wherein the card metaphor comprises a second card panel having a list of the database tables, an associated database field box having a list of the associated database fields, a list of relational conditions, and a find criteria edit box.

18. The program storage device of claim 17, wherein the second card panel further comprises a condition box for displaying the natural language description of the find request.

19. The program storage device of claim 17, wherein the second card panel further comprises a first radio button for specifying an OR logical operator and a second radio button for specifying an AND logical operator.

20. The program storage device of claim 17, wherein the card metaphor comprises a third card panel having a list of the database tables, an associated database field box having a list of the associated database fields, and a sort fields box showing a list of the associated database fields used as sort fields.

21. The program storage device of claim 17, wherein the card metaphor comprises a fourth card panel having a SQL entry field for accepting an SQL database query instruction.

* * * * *